UNITED STATES PATENT OFFICE.

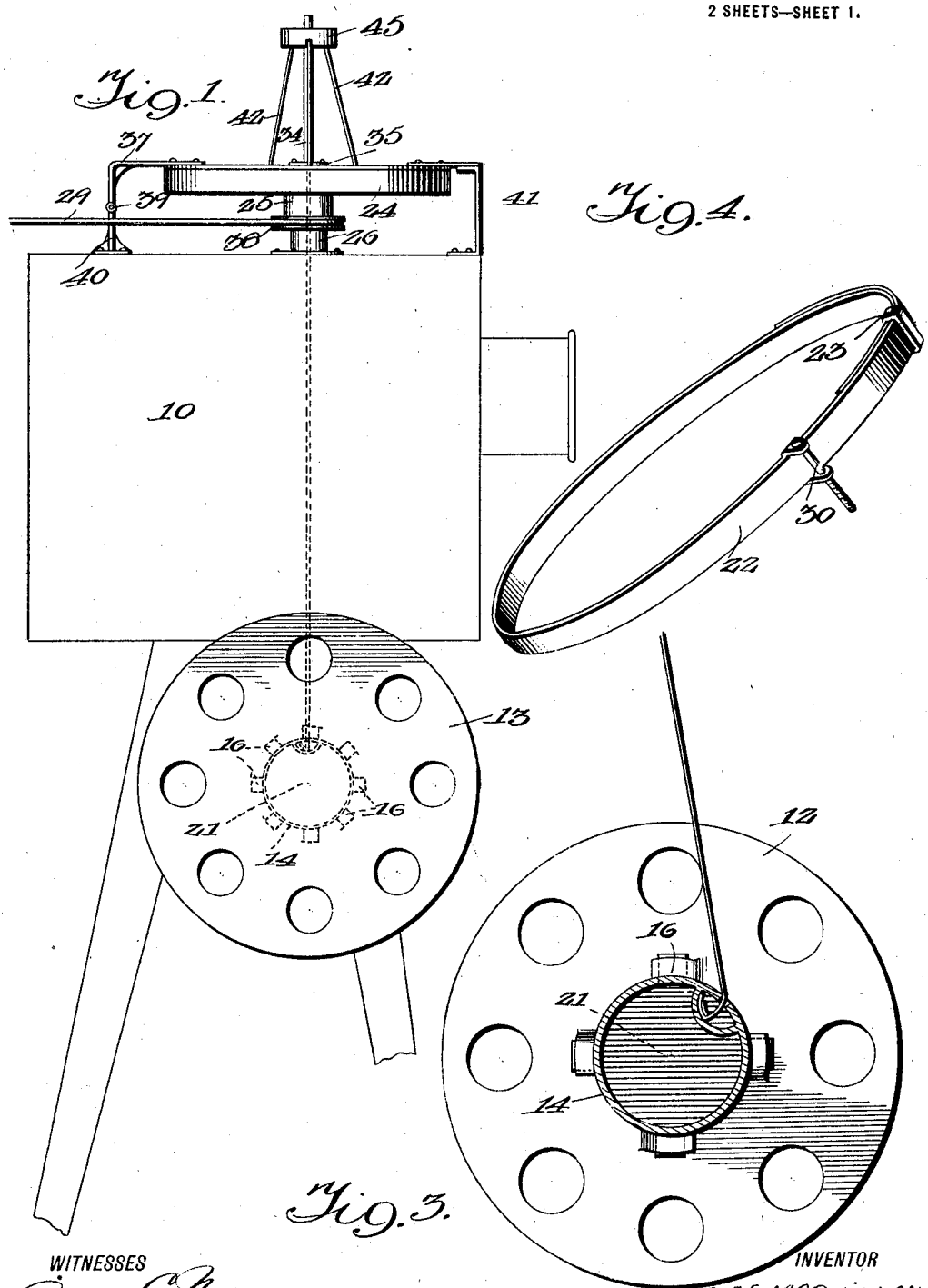

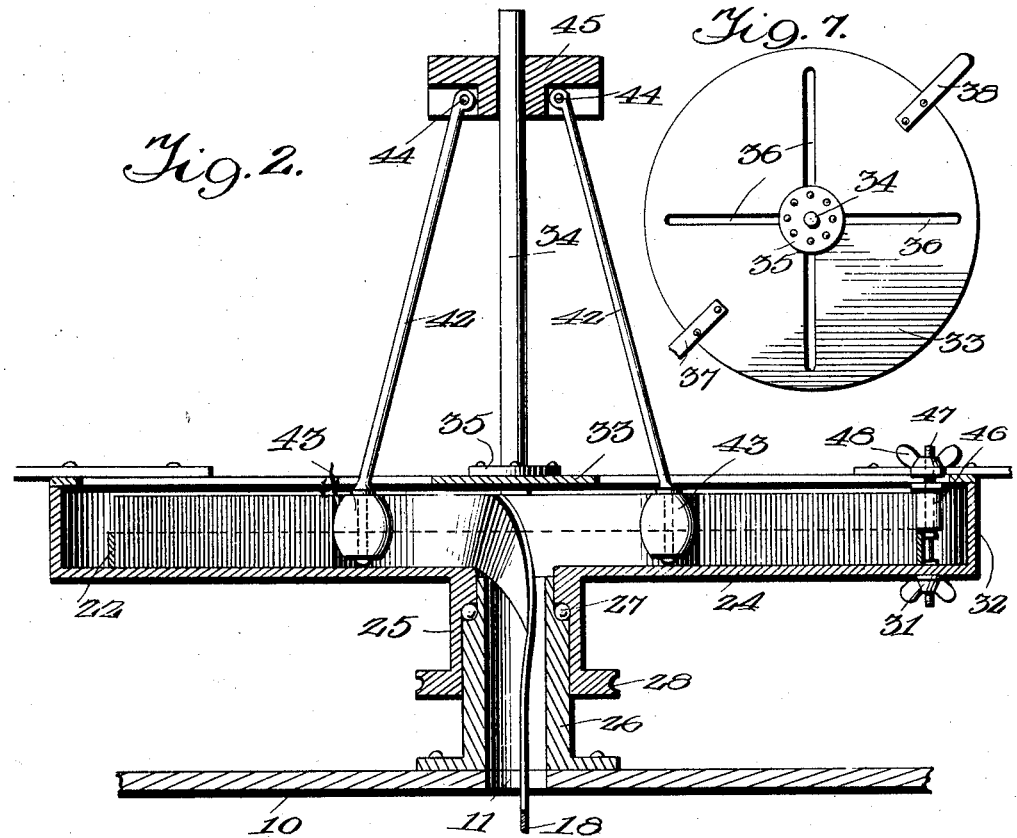

CLAUDE H. McQUILLAN, OF GREEN BAY, WISCONSIN.

FILM-FEED APPARATUS FOR PROJECTION DEVICES.

1,387,283.  Specification of Letters Patent.  Patented Aug. 9, 1921.

Application filed July 9, 1920. Serial No. 395,104.

*To all whom it may concern:*

Be it known that I, CLAUDE H. McQUILLAN, a citizen of the United States, and a resident of Green Bay, in the county of Brown and State of Wisconsin, have made certain new and useful Improvements in Film-Feed Apparatus for Projection Devices, of which the following is a specification.

My present invention relates generally to moving picture and other projectors, and more particularly to film feeding devices therefor, my object being the provision of simple effective means whereby the film may be fed through the projector box from a holder in the same condition that it comes from the take up reel so as to avoid extra handling of the film in reversing the same as is now required between feeding operations.

It is well known at the present time that a film passing through a projecting box from the feeding reel, is wound from the center out upon the take up reel and must then be set up and reversed from the take up reel to the feed reel before it can be again fed from the latter through the projecting box. This gives rise to handling of the film to an undesirable extent as the film is subjected to a great deal of wear, particularly during the reversing operation due to careless operators, and does not receive the same care as it does when fed through the projecting box.

My invention proposes a film holding and feed device from which the film may be fed from its center into and through the projecting box and from the latter on to a take up wheel, the hub and one side of which are detachable with respect to the opposite side, so that the film may be bodily removed and reinserted in the feeding reel or holder.

In the accompanying drawings which illustrate my invention, and form a part of this specification:—

Figure 1 is a side view illustrating the practical application of my invention;

Fig. 2 is an enlarged vertical section through the feeding reel or holder;

Fig. 3 is an enlarged vertical section through the take up reel;

Fig. 4 is a detailed perspective view of the clamping ring;

Fig. 5 is a perspective view looking at the inner face of the removable slide plate of the take up reel;

Fig. 6 is a detailed perspective view of the removable hub of the take up reel, and, Fig. 7 is a top plan view of the top plate of the feeding roll or holder.

Referring now to these figures, and particularly Fig. 1, I have shown a projecting box at 10 which may be a moving picture machine or other projector, having a film receiving opening in its upper wall indicated at 11 in Fig. 2, and having a film outlet opening in its base, the latter above a rotatably mounted and driven take-up roll consisting of inner and outer side plates 12 and 13, and a cylinder hub 14, the latter of which is provided at opposite edges with radially outstanding lugs 15, as particularly shown in Fig. 6, adapted for rotative movement relative to the side plates 12 and 13 beneath and away from laterally offset spring fingers 16, which are up-set from the inner surfaces of the side plates as seen by a comparison of Figs. 3 and 5. The hub 14 also has a slot 17 in its wall inwardly through which the free end of the film 18 may be extended for engagement beneath a spring clip 19, mounted upon an inner segmental wall 20 of the hub and it is thus obvious that with the free end of the film so attached, and with the parts in the operative position shown in Fig. 1, rotation of the reel on its shaft shown in dotted lines at 21 in Figs. 1 and 3, will cause the film to wind between the side plates. When completely wound, the film may be entirely disassociated from the take-up reel by first removing the outer side plate from the inner side plate after which a spring band 22, seen in Fig. 4, whose overlapping ends extend through an adjusting loop 23, is placed around the film and the latter freed at its center from the hub 14. It is thus obvious the film is in this condition adaptable to feeding from the center, and it will be noted from Fig. 2 that the band 22 is of considerably less width than that of the film, for a purpose which will be presently described.

The feed reel or holder consists of a circular plate 24 shown particularly in Fig. 2, having a depending axial tube 25 adapted to telescope the upper end of a tubular upright 26 secured on the projecting box 10 and communicating with the film intake opening 11, tube 25 preferably rotating by anti-friction bearings 27 on the tubular upright, and provided with a pulley 28 at its lower edge connected by a belt 29 as in Fig. 1, to any suitable source of power.

The plate 24 has a radial slot downwardly through which the transversely disposed connecting screw 30 of the spring band 22 projects when the latter with the film inclosed thereby is disposed on the plate, this attaching screw receiving a wing nut 31, as in Fig. 2, below the plate 24, so that the film is thus securely held in proper position.

The plate 24 has a surrounding flange 32, the upper edge of which extends above the film when the film is disposed on the plate and receives a cover 33 having a central upright 34 whose base 35 is secured to the cover at the inner ends of radial slots 36. The cover also has diametrically opposed outstanding straps 37 and 38, the former of which is of the angular shape shown in Fig. 1, and is hinged at 39 to a supporting bracket 40, so that the cover 33 will thus be raised and lowered with respect to the feeding reel 24. The other strap 38 rests in the lower position upon a second bracket 41 upstanding from the projection box 10 and the slots 36 receive the lower portions of arms 42 in slidable relation thereto. These arms have bearings at their lower ends for film engaging rollers 43, provided with convex surfaces, which extend into engagement with the inner peripheral portion of the film roll and continuously press outwardly upon the same by virtue of the hinge connections 44 between the upper ends of the arms 42 and a weight 45 slidable vertically on the upright stem 34 of the cover.

It is thus obvious the film, disengaged from the take up roll in the manner previously described, may be readily disposed and secured within the feeding reel and in flatwise relation upon the plate 24 so that by lowering the cover 33 after the weight 45 has been elevated on the upright stem 34, the several rollers 43 may be extended within the film roll and into engagement with the inner surface thereof. During operation the plate 24 with the film, rotates while the cover 33 remains stationary, and furthermore rotates at a speed conforming to the feed of the film downwardly through the projecting box, and at a speed equaling that of the take-up roll at all times, for instance by driving the belt 29 from the same source as that from which the projecting apparatus is actuated. This avoids the necessity at present of varying the relative speed of the take-up and feed rolls where the film is fed from the outer periphery of the feed roll and wound upon the inner periphery of the take-up roll.

If so desired, a roller 46 may be mounted on the lower end of the stem 47, whose upper threaded portion extends vertically through one of the slots 36 of the cover and receives a wing nut 48 for clamping the same adjustably in place, this roller 46 being adapted to be adjusted into movable engagement with the outer periphery of the film roll as seen in Fig. 2, above the band 22.

I claim:—

1. In a device of the character described, a film feeding device including a rotatable flanged plate having a downwardly opening film feeding aperture at its center and provided with a radial slot, means adjustably held in the said slot for engaging the outer periphery of a film roll on the plate, and a cover for the plate having adjustable pressure means engaging the inner surface of the film roll.

2. The combination with a projection apparatus having a tubular upright, of a film roll holder and feeder consisting of a rotatable plate having a depending tube in telescoping bearing on the said upright, means adjustably attachable to the said plate for surrounding and holding a film roll, and a cover movable on to and off of the plate having adjustable pressure means to engage the interior of a roll disposed on the plate.

3. The combination with a projection apparatus having a tubular upright, of a film roll holder and feeder consisting of a rotatable plate having a depending tube in telescoping bearing on the said upright means adjustably attachable to the said plates for surrounding and holding a film roll, a cover for the plate having radial slots, and an upright stem, a weight movable on the stem, a plurality of arms hinged to the weight at one end and extending at their opposite ends through the cover slots, and rollers mounted on the last mentioned ends of the arms for engagement with the inner surface of the film roll disposed on the plate.

4. A film feeding device including a rotatable flanged plate having a downwardly opening film feeding aperture and arranged in horizontal relation to support a film thereon around said aperture, and a cover for the flanged plate having radial slots therein and having adjustable pressure means including film engaging members depending through and movable in its slots and shiftable into and out of the flanged plate when the cover is placed thereon and removed therefrom.

5. A film feeding device including a rotatable flanged plate having a downwardly opening film feeding aperture, a cover removably associated with the flanged plate and having a central upright stem and a plurality of slots radiating from the stem, a weight slidably mounted on the stem, and film engaging arms pivotally connected at their upper ends to the weight and depending into engagement with a film on the flanged plate through the slots of the cover as described.

CLAUDE H. McQUILLAN.